(No Model.)
C. MORRILL.
SAW SET.
No. 532,175. Patented Jan. 8, 1895.
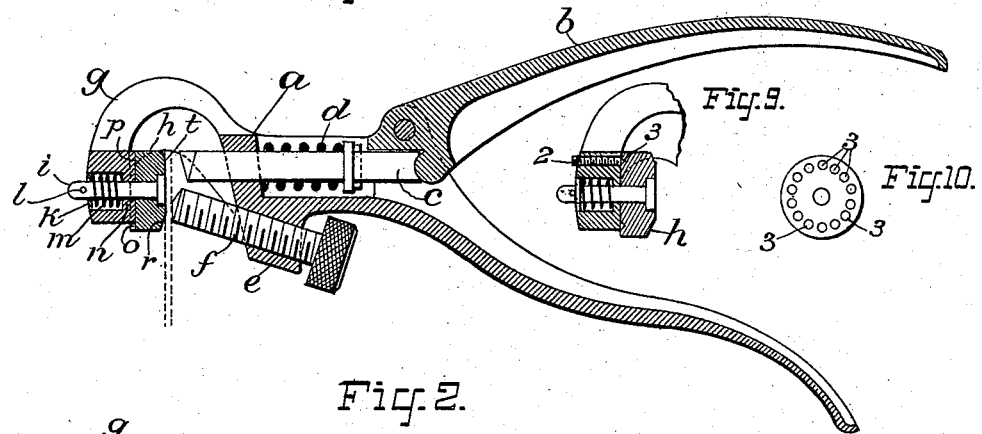
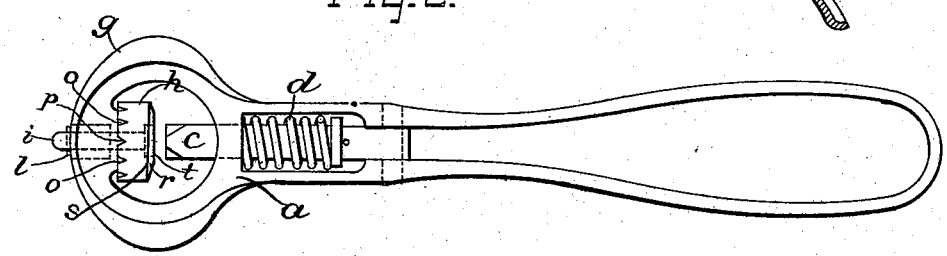
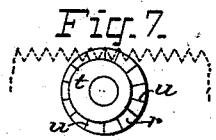
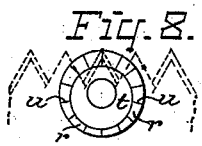
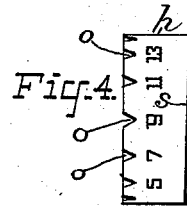
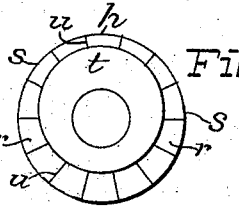
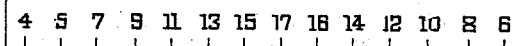
WITNESSES:
M. Loucks
Chas. W. Hurdle
INVENTOR
Chas. Morrill
BY
J. A. Hurdle
ATTORNEY

UNITED STATES PATENT OFFICE.

CHARLES MORRILL, OF NEW YORK, N. Y.

SAW-SET.

SPECIFICATION forming part of Letters Patent No. 532,175, dated January 8, 1895.

Application filed April 19, 1894. Serial No. 508,087. (No model.)

*To all whom it may concern:*

Be it known that I, CHARLES MORRILL, a citizen of the United States, and a resident of the city, county, and State of New York, have invented certain new and useful Improvements in Saw-Sets, of which the following is a specification.

My invention relates to novel improvements in saw-sets, the following being a full and clear description thereof.

My invention consists of a rotary anvil combined with other devices, whereby the said anvil may be adjusted on a circular alignment and locked in position automatically all of which will be fully described and pointed out in the claim hereinafter.

In the accompanying drawings:—Figure 1, represents a longitudinal vertical section. Fig. 2, represents a plan view with the handle removed. Fig. 3, represents an enlarged view of the face of the rotary anvil detached. Fig. 4, is a side view thereof. Fig. 5, is a development of the periphery of the anvil in which is shown the manner of numbering to correspond with the number of saw teeth to the inch to be operated upon. Fig. 6, illustrates the position of the anvil when setting a saw having seventeen teeth to the inch. Fig. 7, shows the position of the anvil when setting a saw having nine teeth to the inch. Fig. 8, shows the position of the anvil when setting a saw having four teeth to the inch. Fig. 9, represents a sectional view of the head of the saw set in which is shown a modified form of the locking device for the anvil. Fig. 10, is a rear elevation of the rotary anvil detached showing the depressions or indentations arranged on one and the same circular alignment.

Similar letters and figures refer to similar parts throughout the drawings, in which—

$a$ represents the main stock of the tool, and $b$ the lever handle thereof, the lower end of the latter being adapted to engage with the rear end of the plunger $c$, the latter of which is held back against the lower end of the aforesaid lever handle $b$ by the retracting spring $d$.

The stock $a$ is provided with a depending lug $e$ through which operates a guide or gage screw $f$. The forward end or head $g$ supports the rotary anvil $h$ which is held in position by the pin $i$, the latter of which being provided at its extreme outer end with a shield washer $k$, which is prevented from being worked off by the holding pin $l$. The pin $i$ is encircled by the spring $m$ the latter of which having one end resting at all times against the shoulder $n$ the other end likewise resting against the shield washer $k$. The rear side of the rotary anvil $h$ is provided with a series of angular grooves or indentations $o$ all of which are arranged diametrically upon the said rotary anvil. Each of the said grooves is in turn adapted to engage with a correspondingly shaped projection $p$ arranged vertically on the inner vertical plane of the head $g$.

The rotary anvil is provided with a continuous inclined plane $r$ whose apex, if carried out, would terminate on the horizontal center of the said anvil. The base line $s$ of the inclined plane is arranged obliquely to the vertical plane $t$ of the said rotary anvil. The inclined plane is also provided with a series of radial lines $u$ each of which indicates the vertical center of the tooth to be set when adjusted against the plane $t$ of the said rotary anvil.

In Figs. 9 and 10, is shown the head $g$ provided with a horizontally arranged adjustable locking screw 2, the forward end of the latter adapted to engage with the correspondingly shaped depression or indentation 3, the whole forming a complete locking device for the rotary anvil.

Mode of operation: The saw is placed against the vertical plane of the rotary anvil in a position that will bring the vertical center of the tooth directly opposite the radial line $u$ indicated on the inclined plane $r$ and immediately in front of the plunger $c$. The guide or gage screw $f$ is adjusted so as to give the saw the desired pitch. The lever handle is then compressed thereby forcing the plunger $c$ forward against the upper portion of the tooth and forcing it against the inclined plane $r$, which results in giving the tooth its proper set.

It will be obvious that it will be utterly impossible to set the teeth beyond the maximum which is predetermined by the inclined plane. Whenever it becomes necessary to set different sized teeth of saws, for instance a saw having eight teeth to the inch, the operator has only to take hold of the anvil and pull it rearwardly until it shall have become disengaged from the vertical projection $p$, then turning the anvil until the figure 8 shall have reached a point directly opposite the aforesaid vertical projection $p$ of the head $g$, then release his hold when the retracting spring $m$ will pull the anvil forward and cause the V-shaped or angular groove to engage with the corresponding projection $p$ thereby locking the same in position. The same operation may be repeated when setting a different sized tooth from that just referred to.

Heretofore saw-sets have been of such a construction as would enable an inexperienced hand to set the teeth of saws beyond the maximum limit thereby distorting the cutting line of the saw, and destroying its proper cutting qualities. This objectionable feature is obviated by my invention hereinbefore described.

It will be obvious that with the continuous inclined plane of the anvil hereinbefore described, and the adjustable guide or gage screw $f$, the blade of the saw may be adjusted in any desired pitch, that is to say, the screw blade may be adjusted so that the tooth need not have as much of an incline in comparison with the plane of the blade of the saw as the inclined plane of the anvil has to the vertical plane of the latter, thereby giving the teeth any set desired by the operator.

Whenever the teeth of a saw shall have been set beyond the limit desired, the operator can adjust the gage screw rearwardly until the plane of the blade of the saw shall have been brought on a line with the inclined plane at the point where the tooth rests. In this instance when the plunger is brought forward and against the tooth it will remove the set thereof and bring it back on a line with the blade of the saw when the teeth of the latter will be in a condition to be reset.

Having described my invention, what I claim as new, and desire to secure by Letters Patent, is—

The combination substantially as shown and described consisting of the main stock $a$ the lever handle $b$ plunger $c$ retracting spring $d$ depending lug $e$ gage screw $f$ rotatively adjustable anvil $h$ having the indentations $o$ thereon the latter adapted to engage with corresponding means for locking the anvil in position pin $i$ shield washer $k$ pin $l$ and spring $m$, the whole forming a complete device.

Signed at the city, county, and State of New York this 18th day of April, A. D. 1894.

CHARLES MORRILL.

Witnesses:
J. A. HURDLE,
CHAS. W. HURDLE.